US006621975B2

(12) United States Patent
Laporte et al.

(10) Patent No.: US 6,621,975 B2
(45) Date of Patent: Sep. 16, 2003

(54) DISTRIBUTION TERMINAL FOR NETWORK ACCESS POINT

(75) Inventors: Richard B. Laporte, Ft. Worth, TX (US); Jennifer A. Battey, Euless, TX (US); Aaron I. Blankenship, Keller, TX (US); Steve A. Fontaine, Ft. Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 42 days.

(21) Appl. No.: 09/997,335

(22) Filed: Nov. 30, 2001

(65) Prior Publication Data

US 2003/0103750 A1 Jun. 5, 2003

(51) Int. Cl.[7] ................................................ G02B 6/00
(52) U.S. Cl. ...................................................... 385/135
(58) Field of Search ................................. 385/134, 135

(56) References Cited

U.S. PATENT DOCUMENTS

| 4,717,231 | A | * | 1/1988 | Dewez et al. ............... 385/135 |
| 4,900,123 | A | * | 2/1990 | Barlow et al. ................. 385/53 |
| 6,009,225 | A | * | 12/1999 | Ray et al. .................... 385/135 |
| 6,385,381 | B1 | * | 5/2002 | Janus et al. .................. 385/134 |
| 6,424,781 | B1 | * | 7/2002 | Puetz et al. ................. 385/135 |
| 6,434,313 | B1 | * | 8/2002 | Clapp et al. ................ 385/135 |

* cited by examiner

Primary Examiner—Robert H. Kim
Assistant Examiner—Thomas Artman
(74) Attorney, Agent, or Firm—Christopher C. Dremann

(57) ABSTRACT

A distribution terminal is provided for interconnecting one or more fiber optic drop cables with at least one fiber optic distribution cable at a convenient access point in a telecommunications network. The terminal comprises a base and a cover adapted to be opened and closed on the base. The base defines an interior cavity having a lower fiber management area for accessing the distribution cable and an upper fiber management area for accessing the drop cables. The upper fiber management area includes a transition panel that is movable relative to the base to provide access to the lower fiber management area. Thus, both the lower fiber management area and the upper fiber management area are easily and readily accessible to a field technician initially installing the terminal and subsequently reconfiguring the optical fiber connections within the terminal at the access point.

14 Claims, 5 Drawing Sheets

DISTRIBUTION TERMINAL FOR NETWORK ACCESS POINT

FIELD OF THE INVENTION

The present invention relates generally to enclosures for telecommunications equipment. More particularly, the invention relates to a distribution terminal for interconnecting one or more drop cables with a distribution cable at an access point in a telecommunications network.

BACKGROUND OF THE INVENTION

Telecommunications service providers are currently developing networks consisting entirely of fiber optic components to meet the demand for high bandwidth communications service to businesses and homes. These "all-optical" telecommunications networks require service terminals, referred to herein as "distribution" terminals, located at access points along the network for interconnecting one or more drop cables to a distribution cable from the service provider. In some instances, certain optical fibers of the distribution cable are connected to optical fibers of a drop cable that is routed directly to the business or home of a subscriber of the communications service. In other instances, the drop cable is routed from the terminal to yet another access point along the telecommunications network to serve as a further distribution cable for additional drop cables. The further distribution cable is sometimes referred to in the art as a branch or "feeder" cable. The optical fiber network may be configured in many different ways, but typically, is configured with a plurality of main distribution cables from the service provider that are interconnected with feeder cables at various network access points. The feeder cables in turn are interconnected with further feeder cables, or with drop cables containing optical fibers that are routed directly to communications equipment belonging to subscribers. As used herein, the term "distribution cable" includes both main distribution cables and feeder cables, as those terms are presently understood by one skilled in the art.

In existing telecommunications networks, the drop cables are typically interconnected with a distribution cable within a splice closure suspended from an aerial telephone cable strand or mounted on a telephone pole. An aerial splice closure is a particular type of network access point terminal that generally includes a longitudinal frame enclosed by a cylindrical housing. The cylindrical housing is intended to optimize the number of optical fiber connections that can be made within the closure. During initial configuration, the fiber management area within the closure for the optical fiber connections may be readily accessible. However, due to the aerial location of the closure and the congestion of the fiber management area, substantial expertise and experience are required to subsequently reconfigure the optical fiber connections. In particular, it is often difficult to locate and identify the optical fibers of the distribution cable that are interconnected with a particular drop cable. Once identified, the opportunity to re-route existing drop cables or to install additional drop cables without exceeding the minimum bend radius of the optical fibers is limited by the complicated fiber routing and the congestion of the fiber management area. The situation is further exacerbated because conventional aerial closures do not include a cover that can be positioned at the aerial location so as to provide substantially unrestricted access to the optical fiber connections within the closure.

While fiber optic networks have traditionally served as the back bone or trunk line of telecommunication networks to transmit signals over relatively long distances, all-optical networks are gradually being extended closer to the end points of the network. In this regard, fiber optic networks are being developed that deliver fiber-to-the-home, fiber-to-the-business, fiber-to-the-desk, and the like. In each of these applications, the distribution terminal must be capable of interconnecting the optical fibers of the drop cables with the optical fibers of the distribution cable to establish the desired optical connections. For example, a distribution terminal utilized in a fiber-to-the-home, fiber-to-the-business, or fiber-to-the-desk application may be mounted on a distribution cable along with one or more drop cables such that certain optical fibers of the distribution cable extend uninterrupted through the terminal, while other optical fibers of the distribution cable are joined with optical fibers of the drop cables. In certain instances, the optical fibers of the drop cables may be joined directly to the optical fibers of the distribution cable at the access point using conventional splicing techniques. In other instances, the optical fibers of the drop cables and the optical fibers of the distribution cable are first spliced to a short length of optical fiber having an optical connector attached at the other end, referred to in the art as a "pigtail." The pigtails are then connected to opposite sides of an adapter to interconnect the drop cables with the distribution cable. As used herein, the term "connectorized" refers to an optical fiber that has been spliced to a pigtail at an access point. Optical fibers are connectorized to permit the optical fiber connections to be subsequently reconfigured at the access point without the optical fibers having to be first separated, then cleaned and polished, and then re-spliced to other optical fibers. In still other instances, the optical fibers of the drop cables may be connectorized at the time of manufacture, referred to herein as "pre-connectorized," and connected at the access point to optical fibers of the distribution cable that have been connectorized. The pre-connectorized optical fibers of the drop cables are interconnected with the connectorized optical fibers of the distribution cable utilizing one or more adapters in a known manner.

Typically, a distribution terminal, for example a conventional aerial splice closure, includes one or more splice trays, coupler trays and/or connector panels that facilitate the splicing or connecting of respective pairs of optical fibers. Most terminals house a large number of optical fiber connections, and thus, include a plurality of splice trays, coupler trays and/or connector panels stacked one upon another or stored in separate compartments within the terminal. The trays and panels are preferably secured within the terminal such that they are fixed in position once the terminal has been initially configured and is placed into service. The trays and panels should not shift or otherwise move once the terminal is placed into service since any shifting or other movement could harm the optical fiber connections. While the trays and panels are desirably fixed in position, the terminal is also preferably designed so that the trays and both sides of the panels can be readily accessed by a field technician during the initial configuration of the terminal in which the optical fiber connections are established and during any subsequent reconfiguration of the terminal wherein at least some of the optical fiber connections are modified. In either instance, the trays and panels must be supported and securely retained in a convenient location that provides the field technician with access to the optical fiber connections housed within the terminal. Reconfiguring an aerial terminal is especially difficult, particularly in applications, such as previously discussed, where at least some of the optical fibers of the distribution cable extend uninterrupted through the terminal. In such instances, sometimes referred to as "taut sheath" applications, the terminal cannot be removed from the distribution cable to reconfigure the optical fiber connections on a work platform located on the ground. Accordingly, the terminal must be reconfigured from a ladder or from an aerial bucket that is positioned in close proximity to the terminal. It is known to provide a work platform on the ladder or aerial bucket. However, the work platform provided on the ladder or aerial bucket cannot always be positioned sufficiently close to the terminal, for example when the cover of the terminal interferes with the ladder or aerial bucket in the opened position. Furthermore, work platforms provided on ladders and aerial buckets typically are not suited for securely retaining the various sized trays and panels that may be housed within aerial terminals.

BRIEF DESCRIPTION OF THE DRAWINGS

The present invention will be described in conjunction with the accompanying drawings in which like reference numerals represent the same or similar parts in the various views. The drawings, which are incorporated in and constitute a part of this specification, provide further understanding of the invention, illustrate various embodiments of the invention, and, together with the description, fully explain the principles and objectives thereof. More specifically.

DETAILED DESCRIPTION OF VARIOUS EMBODIMENTS OF THE INVENTION

The present invention is described more fully hereinafter with reference to the accompanying drawings, in which various embodiments of the invention are shown. The invention may, however, be embodied in many different forms, and therefore, should not be construed as being limited to the embodiments described and shown herein. Illustrative embodiments are set forth herein so that this description will be thorough and complete, and will fully convey the intended scope of the invention while enabling those skilled in the art to make and practice the invention without undue experimentation.

Figure 1:
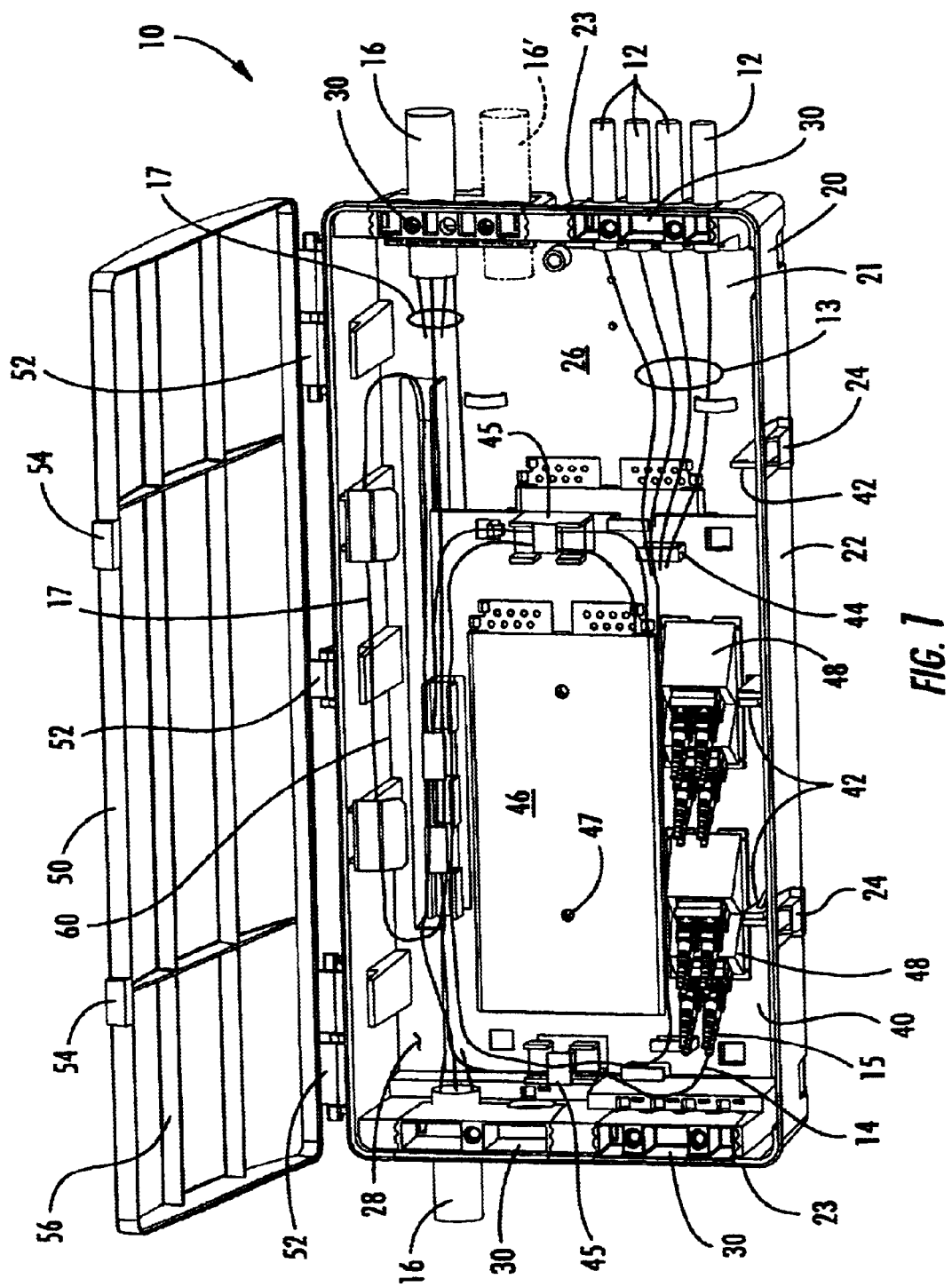
FIG. 1 is a perspective view of a distribution terminal constructed in accordance with the invention shown with the cover opened and the movable transition panel in a first position to provide access to one or more drop cables in the upper fiber management area.
Figure 2:
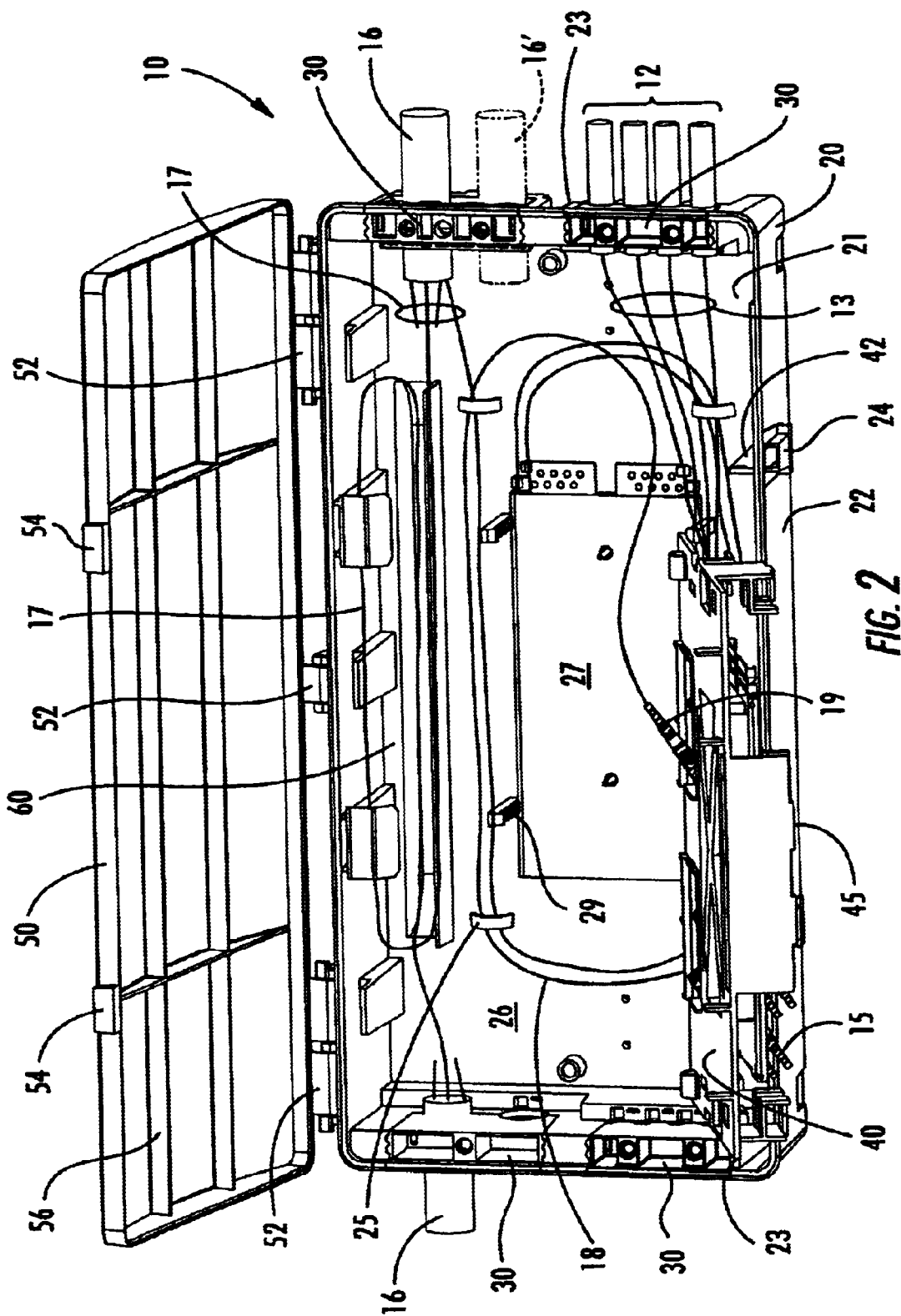
FIG. 2 is a perspective view of the terminal of FIG. 1 shown with the cover opened and the movable transition panel in a second position to provide access to at least one distribution cable in the lower fiber management area.

Referring now to FIGS. 1 and 2, a distribution terminal 10 constructed in accordance with one embodiment of the invention is shown. The terminal 10 permits one or more fiber optic drop cables 12 to be easily and readily interconnected with at least one fiber optic distribution cable 16. As is well known and understood in the art, each drop cable 12 comprises a flexible transport tube 13 containing one or more optical fibers 14 (FIG. 1) connected to communications equipment at a subscriber's premises, such as a home or business. The distribution cable 16 may be a main distribution cable or a feeder cable and comprises at least one, and preferably, a plurality of flexible buffer tubes 17 containing a plurality of optical fibers 18 (FIG. 2) connected to communications equipment from a service provider. In addition to receiving a variety of different types of cables, the terminal 10 may route, connect and store different types of optical fibers, such as loose buffered optical fibers and ribbon fiber. As such, the term "optical fibers" as used herein is intended to include all types of optical fibers, including loose buffered optical fibers, optical fibers in the form of a multi-fiber ribbon, individual optical fibers, or any other known expedient of a fiber optic cable. Additionally, the optical fibers may have various diameters, including for example diameters of 900 micron, 2 mm and 3 mm. The terminal 10 provides a convenient access point in a telecommunications network for a field technician to initially install and subsequently reconfigure the optical fiber connections between the drop cables 12 and the distribution cable 16 within the terminal. The terminal 10 may be a splice terminal, a patch terminal or the like, or any combination thereof, as will be described. Moreover, the terminal 10 may be installed in an aerial location, buried, or disposed in a larger enclosure, such as a ground pedestal. For purposes of example only, and not by way of limitation, the terminal 10 will hereinafter be described as an aerial terminal. As such, the base 20 may be provided with hangars (not shown) for suspending the terminal 10 from an aerial cable strand and/or brackets or straps (not shown) for securing the terminal 10 to a telephone pole, building, or other structure in a known manner. Although the terminal 10 depicted in the illustrated embodiments is an in-line terminal, it may have other configurations, such as a canister or "butt" type terminal, without departing from the intended spirit or scope of the invention.

The terminal 10 comprises a base 20 and a cover 50 each made of a lightweight, yet rigid material, such as aluminum, plastic or thermoplastic. The base 20 is generally box-shaped and defines an interior cavity 21 for housing telecommunications hardware, such as splice trays, coupler trays and adapters, as will be described hereinafter. The base 20 may have any of a variety of shapes that is suitable for housing telecommunications hardware and for routing and interconnecting one or more fiber optic drop cables 12 with at least one fiber optic distribution cable 16. The base 20 of the embodiments illustrated herein is generally rectangular in the lengthwise and widthwise directions and is elongated in the lengthwise dimension (relative to the widthwise dimension) between a pair of opposed, closed ends. Preferably, the depthwise dimension is substantially less than either the lengthwise dimension or the widthwise dimension to optimize access to the optical fiber connections and hardware at any location within the interior cavity 21 of the terminal 10, as will be described. The cover 50 is attached to the base 20 and adapted to be opened and closed thereon. As shown, the cover 50 is generally rectangular and is hingedly affixed to the base 20 along the upper edge of one of the side walls 22 at one or more hinge locations 52. However, the cover 50 may be slidably attached to the base 20 to selectively expose adjacent portions of the interior cavity 21 of the base 20. Alternatively, the cover 50 may be removably attached to the base 20 to provide unobstructed access to the entire interior cavity 21. The base 20 and/or the cover 50 is preferably provided with clasps 24, 54 or other conventional means for securing the cover 50 to the base 20 in the closed configuration. Although not shown, the base 20 and/or cover 50 may also be provided with means for retaining the cover in the opened configuration. If necessary, the cover 50 may be provided with lengthwise and/or widthwise stiffening ribs 56 to strengthen and prevent distortion of the cover 50.

FIG. 1 shows the terminal 10 with the cover 50 hingedly affixed to the base 20 and opened thereon. The terminal 10 is mounted on at least one distribution cable 16 and one or more drop cables 12 in a known manner by a plurality of cable port assemblies 30 provided on the opposed end walls 23 of the base 20. In the embodiment illustrated, the terminal 10 is mounted on a single fiber optic distribution cable 16 comprising a plurality of buffer tubes 17, each of which contains a plurality of optical fibers 18. A portion of the sheath of the distribution cable 16 is removed so that the buffer tubes 17 are exposed within the interior cavity 21 of the terminal 10. At least one of the buffer tubes 17 is routed into a lower fiber management area 26 (FIG. 2), while the remainder of the buffer tubes 17 are routed to a slack storage area 60 where one or more coils of the remaining buffer tubes 17 are stored. The coils of unused buffer tubes 17 are stored in a plane generally perpendicular to the plane of the lower fiber management area 26. Accordingly, the amount of space within the interior cavity 21 of the terminal 10 for interconnecting the optical fibers 14 of the drop cables 12 with the optical fibers 18 of the distribution cable 16 is maximized. The buffer tubes 17 are then routed from the slack storage area 60 out of the terminal 10 through one of the cable port assemblies 30 provided on the opposite end wall 23 of the terminal 10. The configuration described above, in which at least some of the buffer tubes 17 of the distribution cable 16 extend uninterrupted through the terminal 10 while at least one of the buffer tubes 17 is made available for connection with one or more drop and/or feeder cables, is sometimes referred to in the art as a "taut sheath" application. As indicated by the broken lines in FIGS. 1, 2 and 4, a second optical, optical/electrical or electrical distribution cable 16' may extend uninterrupted through the terminal 10 between the opposed end walls 23. Alternatively, a portion of the sheath of the distribution cable 16' may be removed and one or more of the buffer tubes of the distribution cable 16' may be routed into the lower fiber management area 26 while the remaining buffer tubes are routed to the slack storage area 60 and then out of the terminal 10 through one of the cable port assemblies 30 provided on the opposite end wall 23 of the base 20, as previously described.

In the embodiment illustrated, the terminal 10 is also mounted on a plurality, and more specifically, four fiber optic drop cables 12. Each drop cable 12 comprises a transport tube 13 containing one or more optical fibers 14. Typically, each transport tube 13 contains one, two or four optical fibers 14. Thus, the four drop cables 12 shown in FIGS. 1 and 2 can provide up to sixteen separate optical fiber connections, referred to herein as "fiber drops," to subscriber communications equipment. The terminal 10 may also be configured with up to eight drop cables 12 (see FIGS. 3 and 4) each containing one or two optical fibers 14. Thus, the eight drop cables 12 shown in FIGS. 3 and 4 can likewise provide up to sixteen separate fiber drops. The number of drop cables 12 is typically between one and eight and there is typically only one transport tube 13 within each drop cable 12. However, it is conceivable that the terminal 10 could accommodate up to sixteen drop cables 12. The number of fiber drops is typically between one and sixteen. However, depending on the number of drop cables 12, the number of transport tubes 13 within each drop cable 12 and the number of optical fibers 14 within each transport tube 13, theoretically, there is no limit to the number of fiber drops that the terminal 10 could accommodate. The sheaths of the drop cables 12 within the interior cavity 21 of the terminal 10 are removed to expose the transport tubes 13. The transport tubes 13 are routed into an upper fiber management area 28 (FIG. 1) located medially between the lower fiber management area 26 and the cover 50 of the terminal 10. With the cover 50 opened, the upper fiber management area 28 is nearer, and thus, is more easily and readily accessible to a field technician initially installing the terminal 10 at an access point in a telecommunication network or subsequently reconfiguring the optical fiber connections within the terminal 10. For example, the field technician may rearrange the optical fiber connections between the optical fibers 14 of the drop cables and the optical fibers 18 of the distribution cable 16. Alternatively, the field technician may introduce additional drop cables 12 without disturbing the previously installed drop cables and then interconnect the optical fibers 14 of the additional drop cables 12 with the same or different optical fibers 18 of the distribution cable 16.

The transport tubes 13 are routed onto a transition panel 40 disposed within the interior cavity 21 of the terminal 10 in the upper fiber management area 28. The transition panel 40 is movable relative to the base 20 to expose the lower fiber management area 26 to the field technician initially installing the terminal 10 or subsequently reconfiguring the optical fiber connections within the terminal 10 at an access point in a telecommunications network. Preferably, the transition panel 40 is hingedly attached to the base 20 and adapted to be rotated thereon between a stowed position for accessing the upper fiber management are 28 and a deployed position for accessing the lower fiber management area 26 without disturbing the drop cables 12. As shown, the transition panel 40 is rotatable relative to the base 20 through angle of about 110 degrees between the stowed position and the deployed position. The transition panel 40 is generally rectangular and is hingedly affixed to the base 20 along the upper edge of one of the side walls 22 at one or more hinge locations 42. As shown, the hinge locations 42 are located on the side wall 22 opposite the hinge locations 52 that hingedly affix the cover 50 to the base 20. However, the hinge locations 42 may be located on the same side wall 22 as the hinge locations 52. Alternatively, the transition panel 40 may be slidably attached to the base 20 to selectively expose portions of the interior cavity 21 of the base 20, or may be removably attached to the base 20 to provide unobstructed access to the interior cavity 21. The base 20 is preferably provided with at least three hinge locations 42 along the side wall 22 so that the transition panel 40 may be positioned nearer the end wall 23 opposite the end wall 23 through which the drop cables 12 enter the terminal 10. Accordingly, there is sufficient space provided in the upper fiber management area 28 to route the transport tubes 13 of the drop cables 12 between the cable port assemblies 30 and the transition panel 40. Although not shown, the base 20 and/or the transition panel 40 may be provided with conventional means for securing the transition panel 40 to the base 20 in the closed configuration. Furthermore, the base 20 and/or transition panel 40 may be provided with conventional means for retaining the transition panel 40 in the opened configuration. If necessary, the transition panel 40 may also be provided with lengthwise and/or widthwise stiffening ribs to strengthen and prevent distortion of the transition panel 40.

For purposes of example only, and not by way of limitation, a particular configuration of optical fiber connections and telecommunications hardware is illustrated in FIGS. 1 and 2. As best shown in FIG. 1, transport tubes 13 of drop cables 12 converge at routing clip 44 on the generally planar outer surface of transition panel 40. For purposes of clarity, only a representative one of the transport tubes 13 and the routing thereof within the upper fiber management area 28 is shown beyond routing clip 44 on transition panel 40 and will be described herein. It will be readily apparent and well understood by one of ordinary skill in the art that the remaining transport tubes 13 are routed in substantially the same manner as the representative transport tube 13 shown and described herein. The transport tube 13 is routed clockwise around the outer surface of the transition panel 40 and through a series of routing guides 45 to a conventional splice tray 46. Inside the splice tray 46, each optical fiber 14 within the transport tube 13 is spliced to a pigtail 15 in any known manner, such as by fusion or mechanical splicing. The pigtail 15 exits the splice tray 46 and is routed counterclockwise through the routing guides 45 to a transition adapter 48 mounted within an opening 49 (FIG. 5) formed through the transition panel 40. Transition panel 40 comprises a plurality of transition adapters 48. Preferably, transition panel 40 comprises between one and four transition adapters 48, each of which is adapted to receive between one and four pigtails 15. As shown, transition panel 40 comprises a total of four transition adapters 48, each of which is adapted to receive between one and four pigtails 15. Accordingly, up to sixteen optical fibers 14 from transport tubes 13 of drop cables 12 may be interconnected with the optical fibers 18 of the distribution cable 16. For example, in the configuration illustrated herein, each of the four drop cables 12 may comprise a single transport tube 13 containing four optical fibers 14 that are spliced to four pigtails 15 inside splice tray 46. Thus, a total of sixteen connectorized fiber drops are terminated to transition adapters 48 on transition panel 40. It should be noted that transition adapters 48 may be reversed in the lengthwise direction within openings 49 on transition panel 40 to accommodate pigtails 15 from either, or both, directions within internal cavity 21 of base 20. For example, transition adapters 48 may be reversed when the transition panel 40 is positioned nearer the right-hand side of terminal 10 and drop cables 12 enter the terminal 10 through the opposite end wall 23.

As best shown in FIG. 2, one of the buffer tubes 17 of distribution cable 16 is routed into the lower fiber management area 26 while the remaining buffer tubes 17 of distribution cable 16 are routed into the slack storage area 60, as previously described. The active buffer tube 17 is routed counterclockwise within the interior cavity 21 defined by base 20 through a series of routing guides 25 to a conventional splice tray 27. Inside the splice tray 27, the optical fibers 18 within the buffer tube 17 are spliced to pigtails 19 in any known manner, such as by fusion or mechanical splicing. For purposes of clarity, only a representative one of the optical fibers 18 exiting splice tray 27 and terminating in pigtail 19 routed within lower fiber management area 26 is shown and will be described herein. It will be readily apparent and well understood by one of ordinary skill in the art that the remaining optical fibers 18 terminating in pigtails 19 are spliced and routed in substantially the same manner as the representative optical fiber 18 shown and described herein. Upon exiting the splice tray 27, the optical fiber 18 is routed clockwise through the routing guides 25 to the underside of the transition adapter 48 mounted within the opening 49 formed through the transition panel 40. As previously described, transition panel 40 preferably comprises between one and four transition adapters 48, each of which is adapted to receive between one and four pigtails 19. Accordingly, up to sixteen optical fibers 18 from buffer tubes 17 of distribution cable 16 may be interconnected with the optical fibers 14 of drop cables 12 by connecting pigtails 19 to pigtails 15 of the connectorized fiber drops terminated to transition adapters 48 on the outer surface of transition panel 40. Obviously, more than one splice tray 27 may be provided in lower fiber management area 26 to accommodate splicing the optical fibers 18 of distribution cable 16 to pigtails 19. Preferably, a plurality of splice trays 27, for example between one and four, are positioned within the lower fiber management area 26 in stacked relationship by splice tray holders 29. Splice trays 27 may be retained, for example, by threaded posts and wing nuts that engage splice trays 27 in a known manner. Likewise, a plurality of splice trays 46, for example between one and four, are positioned in stacked relationship on transition panel 40 and retained in a known manner, such as by threaded posts and wing nuts that engage the splice trays 46 through openings 47.

Figure 3:
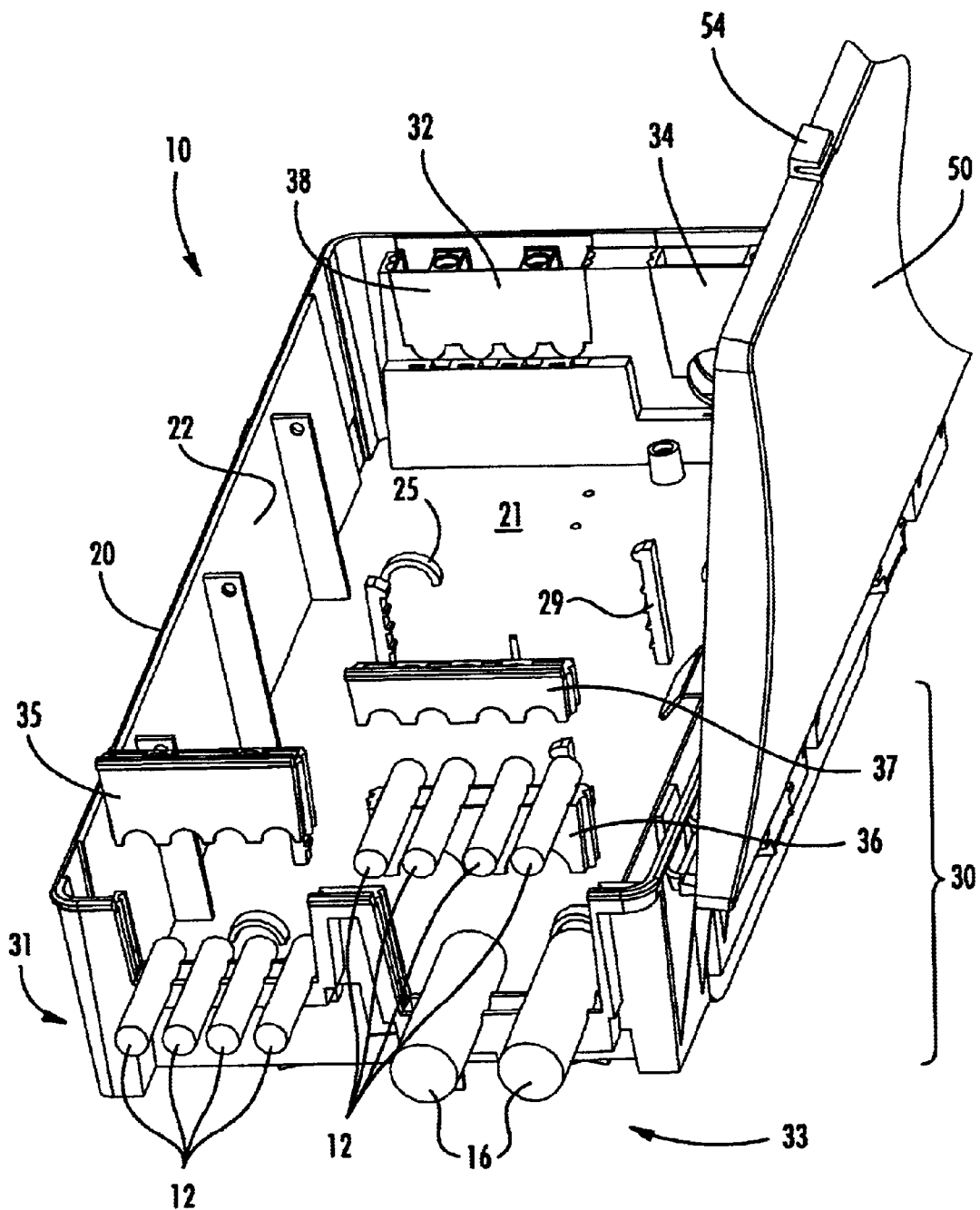
FIG. 3 is a perspective view of one end of a distribution terminal constructed in accordance with the invention shown with the cover opened and the cable port assemblies exploded for purposes of clarity.

As best shown in FIG. 3, terminal 10 is mounted on a plurality of drop cables 12 and at least one distribution cable 16 by cable port assemblies 30 located in end walls 23 of base 20. The cable port assemblies 30 located in the end walls 23 typically receive at least one fiber optic distribution cable 16 that extends through the terminal 10 and the ends of one or more fiber optic drop cables 12. As illustrated, four drop cables 12 are received within port assembly 31 and four drop cables 12 and two distribution cables 16 are received within port assembly 33. Although not illustrated herein, the distribution cables 16 exit the terminal 10 through port assembly 34 located in the end wall 23 of base 20 opposite port assembly 33. In the illustrated embodiment, port assembly 32 is unused. However, port assembly 32 may be utilized in the event that it is desired to reverse the direction that the drop cables 12 enter the terminal 10. Furthermore, port assembly 32 and/or port assembly 34 may each be configured to receive up to four additional drop cables 12 to expand the capacity of the terminal 10. Port assembly 31 has a plurality of semi-circular recesses formed in base 20 and a corresponding plurality of semi-circular recesses formed in cap 35. One or more drop cables 12 are received within the semi-circular recesses formed in the base 20. The cap 35 engages the base 20 such that the semi-circular recesses of the cap 35 are aligned with the semi-circular recesses of the base 20 and the drop cables 12 are retained in a sealed manner between the base 20 and the cap 35. Preferably, base 20 and cap 35 each has four semi-circular recesses formed therein that permit additional drop cables 12 to be installed in the terminal 10 without disturbing the drop cables 12 previously installed. If less than four drop cables 12 are disposed between the base 20 and the cap 35, any empty recesses may be fitted with a plug (not shown) so that the terminal 10 remains rain proof.

Port assembly 33 has a pair of larger diameter semicircular recesses formed in the base 20 and a corresponding pair of larger diameter semi-circular recesses formed in spacer 36. At least one distribution cable 16, for example a 25-mm diameter sheathed cable, is received within the larger diameter semi-circular recesses formed in the base 20. The spacer 36 engages the base 20 such that the larger diameter semi-circular recesses of the spacer 36 are aligned with the larger diameter semi-circular recesses of the base 20 and the distribution cable 16 is retained in a sealed manner between the base 20 and the spacer 36. Preferably, base 20 and spacer 36 each has two larger diameter semi-circular recesses formed therein that permit an additional distribution cable 16 to be installed in the terminal 10 without disturbing the distribution cable 16 previously installed. If only one distribution cable 16 is disposed between the base 20 and the spacer 36, the empty recess may be fitted with a plug (not shown) so that the terminal 10 remains rain proof. Port assembly 33 further comprises a cap 37 that engages the spacer 36 in the same manner that cap 35 engages base 20 to retain and seal up to four additional drop cables 12. Accordingly, cap 37 engages spacer 36 such that the additional drop cables 12 are retained in a sealed manner between the spacer 36 and the cap 37. Preferably, spacer 36 and cap 37 each have four smaller diameter semi-circular recesses formed therein that permit additional drop cables 12 to be installed in the terminal 10 without disturbing the drop cables 12 previously installed. If less than four additional drop cables 12 are disposed between the spacer 36 and the cap 37, any empty recesses may be fitted with a plug (not shown) so that the terminal 10 remains rain proof. As shown, port assembly 32 is unused and comprises a plug 38 that engages the base 20 so that the terminal 10 remains rain proof. As previously mentioned, however, port assembly 32 may be configured similar to port assembly 31 to retain in a sealed manner up to four additional drop cables 12. As shown, port assembly 34 engages base 20 to retain in a sealed manner any distribution cable 16 that exits the terminal 10 through the end wall 23 opposite the port assembly 33. Although not shown, strain relief devices may be provided on any of the port assemblies 31, 32, 33, 34 within the interior 21 of the base 20 to strain relieve the drop cables 12 and/or the distribution cables 16 adjacent the end walls 23 of the terminal 10.

Figure 4:
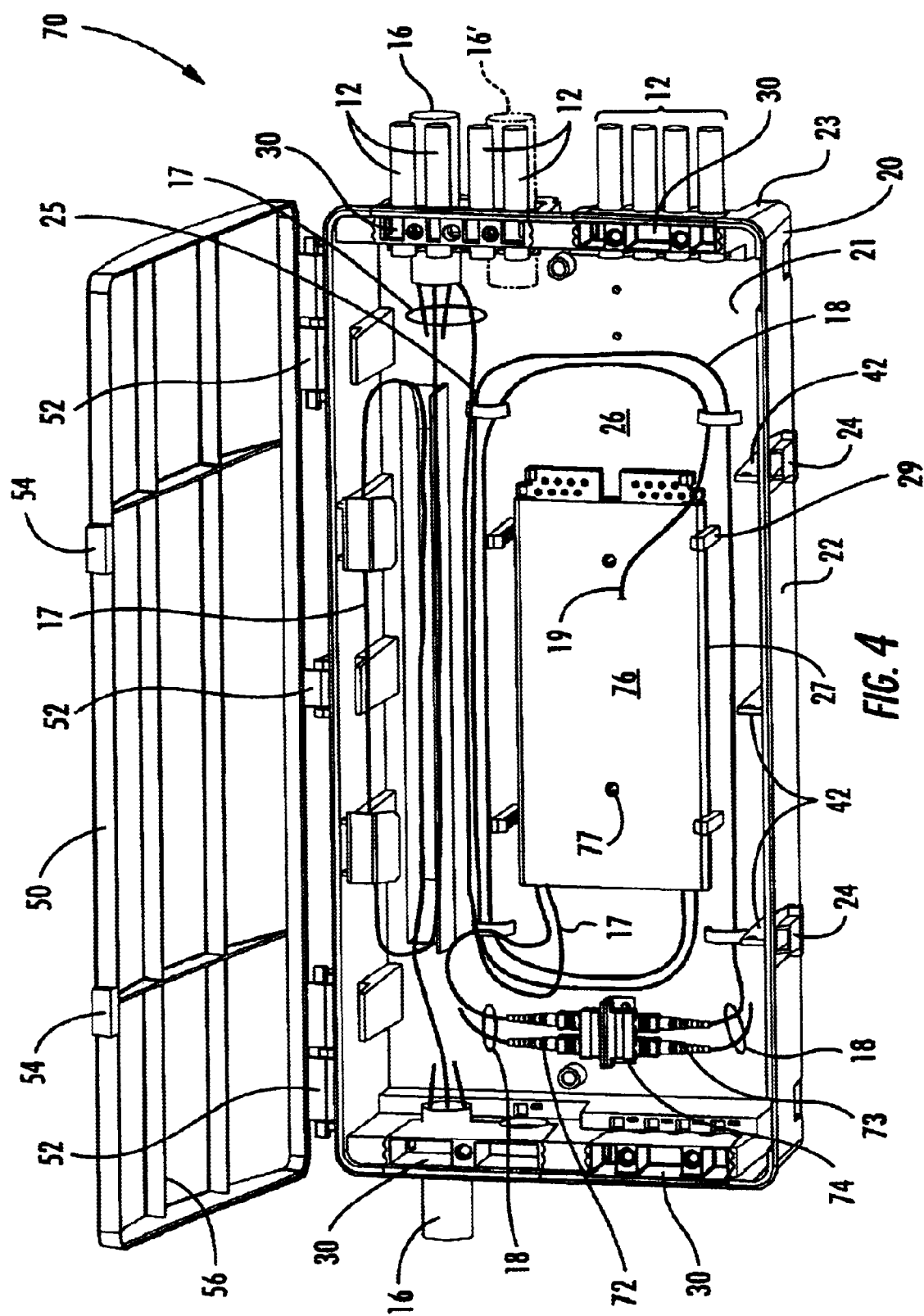
FIG. 4 is a perspective view of another distribution terminal constructed in accordance with the invention shown with the cover in the opened position and the movable transition panel removed for purposes of clarity.

Another distribution terminal 70 constructed in accordance with the invention is shown in FIG. 4. The terminal 70 is shown with the cover 50 in the opened position and the movable transition panel 40 removed from the interior cavity 21 of the base 20 for purposes of clarity. Terminal 70 illustrates an alternative configuration of the lower fiber management area 26, and more particularly, an alternative means for routing the optical fibers 18 of the distribution cable 16 to the optical fibers 14 of the drop cables 12. The configuration of the upper fiber management area 28 is the same as shown in FIGS. 1 and 2 and previously described with the exception that the terminal 70 is mounted on eight drop cables 12, which enter the terminal 70 through port assemblies 31 and 33 in the manner shown in FIG. 3. The distribution cable 16 comprises a plurality of buffer tubes 17, one of which is routed into the lower fiber management area 26 while the remaining buffer tubes 17 are routed into the slack storage area 60. The buffer tube 17 in the lower fiber management area 26 is routed in a counterclockwise direction into splice tray 27. Inside splice tray 27, at least two of the optical fibers 18 within the buffer tube 17 of the distribution cable 16 are spliced to pigtails 72. Pigtails 72 are connected to pigtails 73 through coupler adapter 74 positioned within the interior cavity 21 of base 20. Pigtails 73 are routed in a counterclockwise direction from coupler adapter 73, for example through routing guides 25, to coupler tray 76 positioned on top of splice tray 27. Inside coupler tray 76, each of the two optical fibers 18 within the buffer tube 17 of the distribution cable 16 are split into four separate optical fibers and spliced to pigtails 19. Pigtails 19 are routed from coupler tray 76 to transition adapters 48 on the underside of transition panel 40, as previously described. Pigtails 19 are connected to pigtails 15 through transition adapters 48 to interconnect the optical fibers 14 of drop cables 12 with the optical fibers 18 of distribution cable 16. Terminal 70 preferably comprises a plurality of splice trays 27 and coupler trays 76, for example between one and four, that are positioned within the lower fiber management area 26 in stacked relationship by splice tray holders 29. Splice trays 27 and coupler trays 76 may be retained in a known manner, such as by threaded posts and wing nuts that engage the splice trays 27 and coupler trays 76 through openings 77. Of course, the optical fibers 18 of the distribution cable 16 may be routed directly to one or more coupler trays 76, split and spliced directly to pigtails 19. However, the use of splice trays 27 and coupler adapter 74 permit quick installation and removal of coupler trays 76 within lower fiber management area 26 of terminal 10. Accordingly, coupler trays 76 may be spliced by the field technician, connectorized by the field technician (i.e., field-terminated), or pre-connectorized (i.e., factory-terminated).

Figure 5:
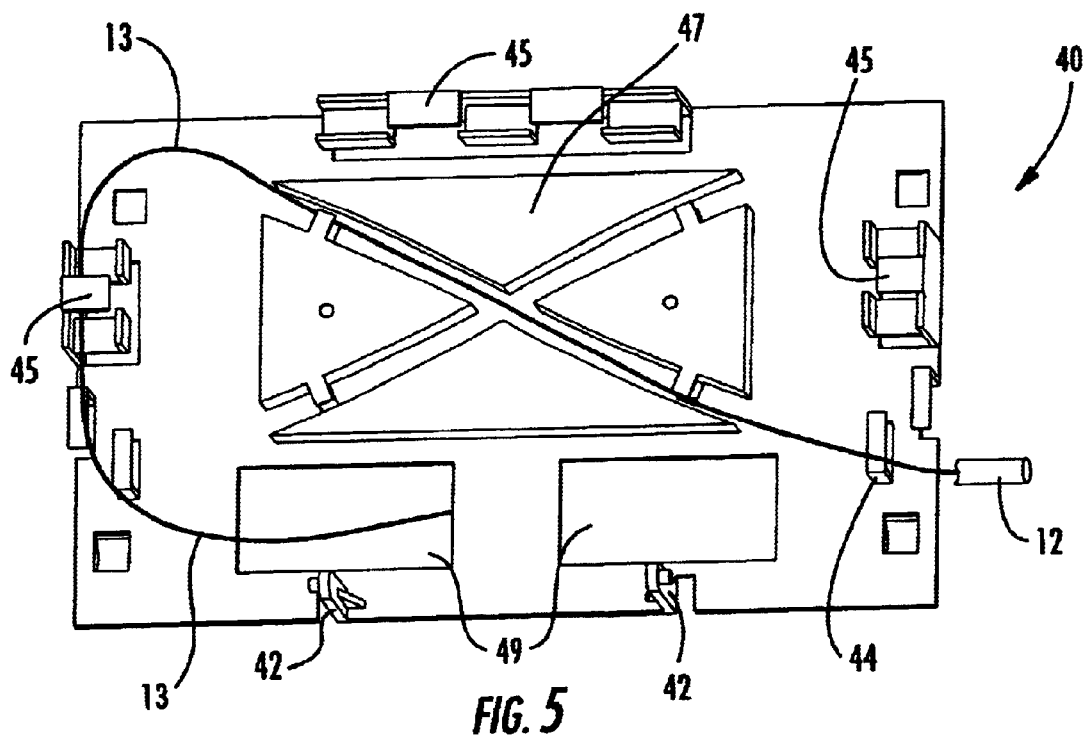
FIG. 5 is a detail perspective view of a movable transition panel constructed in accordance with the invention illustrating a method of routing one or more fiber optic drop cables for interconnection with at least one fiber optic distribution cable by direct splicing.
Figure 6:
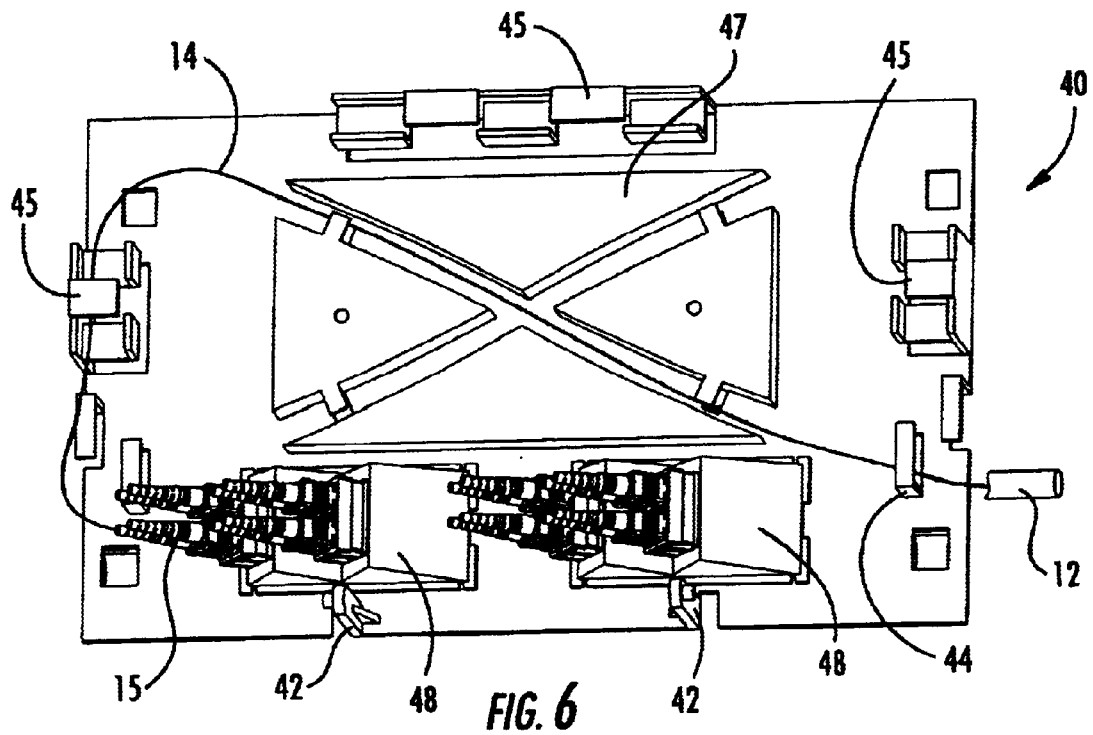
FIG. 6 is a detail perspective view of another movable transition panel constructed in accordance with the invention illustrating a method of routing one or more pre-connectorized fiber optic drop cables for interconnection with at least one fiber optic distribution cable.

FIGS. 5 and 6 illustrate alternative methods of routing one or more fiber optic drop cables 12 onto transition panel 40 in the upper fiber management area 28 for interconnection with at least one fiber optic distribution cable 16 configured as shown in FIGS. 1 and 2. In particular, FIG. 5 is a detail view of movable transition panel 40 showing a representative drop cable 12 having a transport tube 13 that is routed from the upper fiber management area 28 of terminal 10 onto transition panel 40 through routing clip 44. In this alternative configuration, splice tray 27 and transition adapters 48 are removed and the transport tube 13 is routed counterclockwise along one of the tracks of X-shaped raceway 47 to the routing guide 45 opposite routing clip 44. Raceway 47 ensures that the minimum bend radius of the optical fibers is not exceeded. The transport tube 13 is next routed along routing guide 45 to one of the openings 49 formed through the transition panel 40. The transport tube 13 passes through the transition panel 40 into the lower fiber management area 26 within interior cavity 21 of base 20 and is routed into splice tray 27. Inside splice tray 27, the optical fibers 14 of drop cables 12 are interconnected with the optical fibers 18 of the distribution cable 16 by direct splicing in any known manner, such as by fusion or mechanical splicing. FIG. 6 is a detail view of movable transition panel 40 showing a representative drop cable 12 having at least one pre-connectorized optical fiber 14 that terminates in pigtail 15. The optical fiber 14 is routed from the upper fiber management area 28 of terminal 10 onto transition panel 40 through routing clip 44. In this alternative configuration, splice tray 27 is removed and the optical fiber 14 is routed counterclockwise along one of the tracks of X-shaped raceway 47 to the routing guide 45 opposite routing clip 44. Raceway 47 ensures that the minimum bend radius of the optical fibers is not exceeded. The optical fiber 14 is next routed along routing guide 45 to one of the transition adapters 48 positioned within openings 49 formed through the transition panel 40. The optical fiber 14 terminates in pigtail 15 that is connected to pigtail 19 of distribution cable 16 through transition adapter 48. As previously described, the pigtails 19 are spliced to the optical fibers 18 of distribution cable 16 inside splice tray 27. Accordingly, the optical fibers 14 of the drop cables 12 are interconnected with the optical fibers 18 of the distribution cable 16. The configuration illustrated in FIG. 6 permits the optical fiber connections within terminal 10 to be easily and readily reconfigured once the terminal 10 has been initially configured and placed into service. Accordingly, the drop cables 12 and the distribution cable 16 may be spliced by the field technician, connectorized by the field technician (i.e., field-terminated), or pre-connectorized (i.e., factory-terminated).

The illustrative embodiments of a distribution terminal according to the invention shown and described herein provide a number of significant advantages over previously known distribution terminals, such as conventional splice closures. For purposes of example only, and not by way of limitation, a distribution terminal constructed in accordance with the invention provides a field technician with substantially greater access to the optical fiber connections between the drop cables and the distribution cable within the terminal. In particular, the drop cables are routed to telecommunications hardware, such as splice trays and transition adapters, on a movable transition panel located in the upper fiber management area. The distribution cable is routed to telecommunications hardware, such as splice trays, coupler trays and coupler adapters, within the lower fiber management area. The lower fiber management area is easily and readily accessible by rotating the transition panel from a stowed position to a deployed position. It should be noted that the drop cables in the illustrated embodiments converge at a common routing clip adjacent to one of the hinge locations such that the transport tubes of the drop cables are substantially parallel to the axis of rotation of the transition panel. Accordingly, the rotatable transition panel separates the distribution cable from the drop cables without the need to strain relieve the transport tubes adjacent the transition panel. Furthermore, the lengthwise dimension of the transition panel is only about two-thirds the lengthwise dimension of the terminal. At least two pairs of hinge locations are provided on the terminal so that the transition panel may be located nearer the end wall of the terminal that is opposite the end wall through which the drop cables enter the terminal. Thus, the slack in the transport tubes or optical fibers of the drop cables may be maintained as the transition panel is rotated between the stowed position and the deployed position. The unused or "express" buffer tubes of the distribution cable are routed to the slack storage area and coiled in a plane that is substantially perpendicular to the plane of the lower fiber management area. Accordingly, the space available within the lower fiber management area for routing the active buffer tube of the distribution cable and for making optical fiber connections is maximized.

Obviously, a distribution terminal constructed in accordance with the invention permits numerous configurations of telecommunications hardware and associated methods for routing fiber optic drop cables to be interconnected with a distribution cable. For purposes of example only, and not by way of limitation, a distribution terminal constructed in accordance with the invention may be configured to route optical fibers of the drop cables from the transition panel in the upper fiber management area to one or more splice trays in the lower fiber management area for direct splicing to certain optical fibers of the distribution cable. Alternatively, the optical fibers of the drop cables may be routed to one or more splice trays on the transition panel and spliced to pigtails. Similarly, the optical fibers of the distribution cable are routed to one or more splice trays and spliced to pigtails. The connectorized pigtails of the drop cables are then connected to the connectorized pigtails of the distribution cable through transition adapters provided on the transition panel. Alternatively, the optical fibers of the drop cables may be "pre-connectorized" and routed directly to the transition adapters for connection to the connectorized pigtails of the distribution cable. Alternatively yet, the optical fibers of the distribution cable may be first routed to one or more splice trays and spliced to pigtails, as previously described. Thereafter, the splice tray pigtails are connected to coupler tray pigtails from a coupler tray positioned on top of the splice tray in the lower fiber management area through one or more coupler adapters. The coupler tray pigtails are next split inside the coupler tray into multiple pigtails that connect to the pigtails of the drop cables through the transition adapters, as previously described. Of course, the optical fibers of the distribution cable may be routed directly to one or more coupler trays and spliced to directly to the pigtails that are connected to the pigtails of the drop cables through the transition adapters.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed herein and that further modifications and other embodiments are intended to be included within the scope of the appended claims. Although specific terms are employed herein, they are used in a generic and descriptive sense only and not for purposes of limitation.

That which is claimed is:

1. An optical fiber distribution terminal for interconnecting one or more drop cables with at least one distribution cable, the terminal comprising:

a base defining a lower fiber management area for receiving and routing the distribution cable and an upper fiber management area for receiving and routing the drop cables;

a panel disposed within the base, the panel separating the lower fiber management area from the upper fiber management area and movable relative to the base to provide access to the distribution cable in the lower fiber management area;

at least one splice tray disposed within the lower fiber management area for splicing at least one optical fiber of the distribution cable to at least one optical fiber terminating in a first pigtail;

at least one splice fray disposed within the upper fiber management area for splicing at least one optical fiber of the one or more drop cables to at least one optical fiber terminating in a second pigtail; and at least one transition adapter disposed within the upper fiber management area for connecting the first pigtail to the second pigtail.

2. A distribution terminal according to claim 1 wherein the base comprises opposed end walls and further comprising at least one cable port assembly disposed in an end wall for retaining the one or more drop cables and the distribution cable between the base and the cable port assembly.

3. A distribution terminal according to claim 2 wherein the at least one cable port assembly comprises a first port assembly for retaining the one or more drop cables between the base and the first port assembly and a second port assembly for retaining the distribution cable between the base and the second port assembly.

4. A distribution terminal according to claim 3 wherein the first port assembly comprises a first cap for retaining the one or more drop cables between the base and the first cap and wherein the second port assembly comprises a spacer for retaining the distribution cable between the base and the spacer and a second cap for retaining one or more additional drop cables between the spacer and the second cap.

5. A distribution terminal according to claim 1 wherein the distribution cable comprises a plurality of buffer tubes each containing one or more optical fibers and further comprising a slack storage area disposed within the base, the slack storage area storing at least some of the buffer tubes of the distribution cable.

6. A distribution terminal according to claim 5 wherein the plane defined by the buffer tubes stored in the slack storage area is generally perpendicular to the plane defined by the lower fiber management area.

7. An optical fiber distribution terminal for interconnecting one or more drop cables with at least one distribution cable, the terminal comprising:
   a base defining a lower fiber management area for receiving and routing the distribution cable and an upper fiber management area for receiving and routing the drop cables;
   a panel disposed within the base, the panel separating the lower fiber management area from the upper fiber management area and movable relative to the base to provide access to the distribution cable in the lower fiber management area;
   at least one splice tray disposed within the lower fiber management area for splicing optical fibers of the distribution cable to at least one optical fiber terminating in a first pigtail;
   at least one splice tray disposed within the upper fiber management area for splicing optical fibers of the one or more drop cables to a plurality of optical fibers each terminating in a second pigtail;
   at least one coupler tray disposed within the lower fiber management area, the coupler tray having at least one optical fiber terminating in a third pigtail and a plurality of optical fibers each terminating in a fourth pigtail;
   at least one coupler adapter disposed within the lower fiber management area for connecting the third pigtail to the first pigtail; and
   at least one transition adapter disposed within the upper fiber management area for connecting the fourth pigtails to the second pigtails.

8. An optical fiber distribution terminal for interconnecting one or more drop cables with at least one distribution cable, the terminal comprising:
   a base defining a lower fiber management area for receiving and routing the distribution cable and an upper fiber management area for receiving and routing the drop cables;
   a panel disposed within the base, the panel separating the lower fiber management area from the upper fiber management area and movable relative to the base to provide access to the distribution cable in the lower fiber management area;
   at least one coupler tray disposed within the lower fiber management area, the coupler tray having a plurality of optical fibers each terminating in a first pigtail;
   at least one splice tray disposed within the upper fiber management area for splicing optical fibers of the one or more drop cables to a plurality of optical fibers each terminating in a second pigtail; and
   at least one transition adapter disposed within the upper fiber management area for connecting the first pigtails to the second pigtails.

9. An optical fiber distribution terminal comprising:
   a base defining a lower fiber management area for receiving and routing at least one distribution cable and an upper fiber management area for receiving and routing one or more drop cables;
   means disposed within the base for separating the lower fiber management area from the upper fiber management area and for selectively accessing the lower fiber management area without disturbing the routing of the drop cables in the upper fiber management area;
   at least one splice fray disposed within the lower fiber management area for splicing at least one optical fiber of the distribution cable to at least one optical fiber terminating in a first pigtail;
   at least one splice tray disposed within the upper fiber management area for splicing at least one optical fiber of the one or more drop cables to at least one optical fiber terminating in a second pigtail; and
   at least one transition adapter disposed within the upper fiber management area for connecting the first pigtail to the second pigtail.

10. A distribution terminal according to claim 9 wherein the means for separating and for selectively accessing comprises a movable panel disposed within the upper fiber management area, the panel movable between a stowed position to provide access to the routing of the one or more drop cables in the upper fiber management area and a deployed position to provide access to the routing of the distribution cable in the lower fiber management area without disturbing the routing of the one or more drop cables in the upper fiber management area.

11. An optical fiber distribution terminal comprising:
   a base defining a lower fiber management area for receiving and routing at least one distribution cable and an upper fiber management area for receiving and routing one or more drop cables;
   means disposed within the base for separating the lower fiber management area from the upper fiber management area and for selectively accessing the lower fiber management area without disturbing the routing of the drop cables in the upper fiber management area;
   at least one splice tray disposed within the lower fiber management area for splicing optical fibers of the distribution cable to at least one optical fiber terminating in a first pigtail;
   at least one splice tray disposed within the upper fiber management area for splicing optical fibers of the one or more drop cables to a plurality of optical fibers each terminating in a second pigtail;
   at least one coupler tray disposed within the lower fiber management area, the coupler tray having at least one optical fiber terminating in a third pigtail and a plurality of optical fibers each terminating in a fourth pigtail;
   at least one coupler adapter disposed within the lower fiber management area for connecting the third pigtail to the that pigtail; and
   at least one transition adapter disposed within the upper fiber management area for connecting the fourth pigtails to the second pigtails.

12. An optical fiber distribution terminal comprising:
   a base defining a lower fiber management area for receiving and routing at least one distribution cable and an upper fiber management area for receiving and routing one or more drop cables;

means disposed within the base for separating the lower fiber management area from the upper fiber management area and for selectively accessing the lower fiber management area without disturbing the routing of the drop cables in the upper fiber management area;

at least one coupler tray disposed within the lower fiber management area, the coupler way having a plurality of optical fibers each terminating in a first pigtail;

at least one splice tray disposed within the upper fiber management area for spiking optical fibers of the one or more drop cables to a plurality of optical fibers each terminating in a second pigtail; and at least one transition adapter disposed within the upper fiber management area for connecting the first pigtails to the second pigtails.

13. An optical fiber distribution terminal for interconnecting one or more drop cables with at least one distribution cable, the terminal comprising:

a base defining a lower fiber management area for receiving and routing the distribution cable and an upper fiber management area for receiving and routing the one or more drop cables;

a transition panel movably attached to the base for separating the lower fiber management area from the upper fiber management area, the transition panel movable between a stowed position to provide access to the upper fiber management area and a deployed position to provide access to the lower fiber management area;

wherein the distribution cable is spliced to at least one distribution pigtail within the lower fiber management area;

wherein the one or more drop cables is spliced to at least one drop pigtail within the upper fiber management area; and wherein at least one transition adapter is disposed within the base for connecting the distribution pigtail to the drop pigtail.

14. An optical fiber distribution terminal for interconnecting optical fibers at a network access point, the terminal comprising:

a base defining a lower compartment for receiving and routing a distribution cable and an upper compartment for receiving and routing one or more drop cables;

a panel movably attached to the base and disposed within the upper compartment, the panel movable between a first position to provide access to the drop cables in the upper compartment and a second position to provide access to the distribution cable in the lower compartment without the need to strain relieve the drop cables adjacent the panel;

wherein the distribution cable is spliced to at least one distribution pigtail within the lower compartment;

wherein the one or more drop cables is spliced to at least one drop pigtail within the upper compartment; and wherein at least one transition adapter is disposed within the base for connecting the distribution pigtail to the drop pigtail.

* * * * *

UNITED STATES PATENT AND TRADEMARK OFFICE
CERTIFICATE OF CORRECTION

PATENT NO.    : 6,621,975 B2
DATED         : September 16, 2003
INVENTOR(S)   : Richard B. Laporte et al.

It is certified that error appears in the above-identified patent and that said Letters Patent is hereby corrected as shown below:

Column 15,
Line 9, delete "way", and add -- tray --.
Line 12, delete "spiking", and add -- splicing --.

Signed and Sealed this

Sixteenth Day of December, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,621,975 B2                                              Page 1 of 1
DATED         : September 16, 2003
INVENTOR(S)   : Richard B. Laporte, Jennifer A. Battey, Aaron I. Blankenship and Steve A. Fontaine It is certified that error appears in the above-identified patent and that said Letters Patent is hereby corrected as shown below:

Column 12,
Line 50, delete "fray" and add -- tray --.

Column 14,
Line 14, delete "fray" and add -- tray --.

Signed and Sealed this

Twenty-third Day of December, 2003

JAMES E. ROGAN
*Director of the United States Patent and Trademark Office*